United States Patent
Onozawa et al.

(10) Patent No.: US 6,924,614 B2
(45) Date of Patent: Aug. 2, 2005

(54) OPENING AND CLOSING CONTROL DEVICE FOR OPENING AND CLOSING MEMBER OF VEHICLE

(75) Inventors: Satoru Onozawa, Anjo (JP); Yasuaki Hiraki, Nisshin (JP); Seika Matsui, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 148 days.

(21) Appl. No.: 10/420,823

(22) Filed: Apr. 23, 2003

(65) Prior Publication Data

US 2003/0234543 A1 Dec. 25, 2003

(30) Foreign Application Priority Data

Apr. 23, 2002 (JP) ......................................... 2002-121007

(51) Int. Cl.⁷ ................................................. G05B 5/00
(52) U.S. Cl. ........................ 318/466; 318/283; 318/456
(58) Field of Search ................................. 318/466, 283, 318/456, 434, 432, 629, 280, 445, 468, 488; 358/162

(56) References Cited

U.S. PATENT DOCUMENTS 5,903,699 A * 5/1999 Tanaka et al. ................ 386/23
5,977,732 A 11/1999 Matsumoto

FOREIGN PATENT DOCUMENTS

| DE | 198 04 175 A | 3/1997 |
| JP | 6-253570 A | 9/1994 |
| JP | 10-257791 A | 9/1998 |
| WO | WO 95/02268 A | 1/1995 |

* cited by examiner

*Primary Examiner*—Karen Masih
(74) *Attorney, Agent, or Firm*—Burns, Doane, Swecker & Mathis, LLP

(57) ABSTRACT

An opening and closing device for an opening and closing member of a vehicle includes a driving motor, a feedback control unit for controlling an output duty to the driving motor so that a preset target speed of the driving motor can be achieved, a high-pass filter for filtering a frequency of an actual speed of the driving motor, and a pinching determination unit for determining a pinching of an object based on an output from the high-pass filter.

5 Claims, 6 Drawing Sheets

OPENING AND CLOSING CONTROL DEVICE FOR OPENING AND CLOSING MEMBER OF VEHICLE

This application is based on and claims priority under 35 U.S.C. § 119 with respect to Japanese Application No. 2002-121007 filed on Apr. 23, 2002, the entire content of which is incorporated herein by reference.

FIELD OF THE INVENTION

This invention generally relates to an opening and closing control device for an opening and closing member of a vehicle such as a rear door of a one box car and a sunroof of a vehicle. More particularly, the present invention pertains to an opening and closing control device for an opening and closing member of a vehicle which performs a feedback control of an output duty to a driving motor so that a preset target speed of a motor can be obtained.

BACKGROUND OF THE INVENTION

Known opening and closing control device for an opening and closing member of a vehicle drives the opening and closing member of the vehicle by increasing or decreasing an output duty to a driving motor by a feedback control based on a difference between a target speed and an actual speed of the driving motor so that the actual speed is brought close to the target speed. This kind of control device for the opening and closing member of the vehicle is disclosed in Japanese Patent Laid-Open Publication Nos. 6-253570 and 10-257791.

According to each disclosed control device, when pinching of an object is detected at a pinching determination, the motor is reversed so that the object can be surely released from the opening and closing member.

Precisely, according to Japanese Patent Laid-Open Publication No. 10-257791, the ripple of the driving motor is first detected. The actual speed of the driving motor is evaluated by FV conversion of the ripple. Then, the actual speed is differentiated whereby an acceleration of the driving motor is obtained. Further, the torque disturbance applied to the driving motor is evaluated by the actual speed and the acceleration of the driving motor. A change speed of the torque disturbance, which is evaluated by differentiating the torque disturbance, is compared with a determination value for determining the pinching of the object.

The above-mentioned disclosed control device, however, has a complicated structure. Thus, it is considered to determine the pinching of the object by simply comparing a differential value of the actual speed of the driving motor with a predetermined value. In this case, frequency characteristics of the differential value of the actual motor speed are shown in FIG. 5. The gain increases as the frequency increases in FIG. 5. A change amount of the motor speed can be extracted by using the differential. However, an amplitude of a high-frequency based on the noise is larger and thus a peak value of the high-frequency exceeds the predetermined value whereby the wrong determination that the pinching has occurred may be caused as shown in FIG. 6.

Thus, a need exists for an opening and closing control device for an opening and closing member of a vehicle which addresses at least the forgoing drawback associated with other known opening and closing control device for the opening and closing member of the vehicle.

SUMMARY OF THE INVENTION

According to a first aspect of the present invention, an opening and closing device for an opening and closing member of a vehicle includes a driving motor, a feedback control means for controlling an output duty to the driving motor so that a preset target speed of the driving motor can be achieved, a high-pass filter for filtering a frequency of an actual speed of the driving motor and a pinching determination means for determining a pinching of an object based on an output from the high-pass filter.

According to a second aspect of the present invention, an opening and closing device for an opening and closing member of a vehicle includes a driving motor, a feedback control means for controlling an output duty to the driving motor so that a preset target speed of the driving motor can be achieved, a band-pass filter for filtering a frequency of an actual speed of the driving motor, and a pinching determination means for determining a pinching of an object based on an output from the band-pass filter. Gains in a low-frequency range and a high-frequency range respectively are decreased as a frequency is decreased in the low-frequency range and increased in the high-frequency range respectively.

According to a third aspect of the present invention, an opening and closing device for an opening and closing member of a vehicle includes a driving motor, a feedback control means for controlling an output duty to the driving motor so that a preset target speed of the driving motor can be achieved, and a calculation means for calculating an actual speed of the driving motor from a ripple frequency of a voltage or a current applied to the driving motor.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

An embodiment of the present invention is explained referring to attached drawings.

Figure 1:
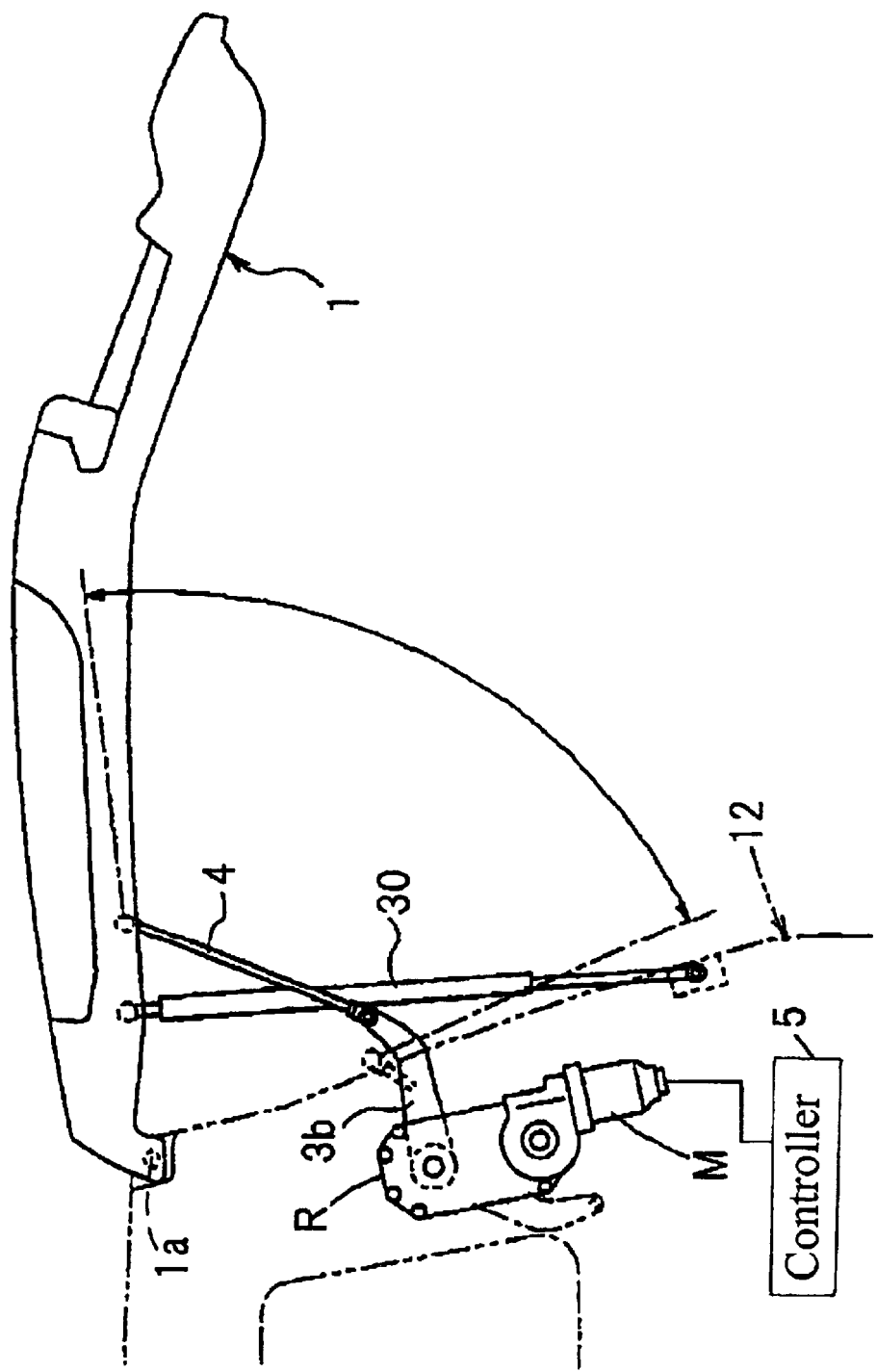
FIG. 1 is a view showing a structure of a drive mechanism of an opening and closing member of a vehicle which employs an opening and closing control device according to an embodiment of the present invention.

An opening and closing control device for an opening and closing member of a vehicle according to the present invention is used for, for example, a back door of the vehicle as shown in FIG. 1. The opening and closing control device can be applied to various doors of the vehicle such as a driver side door, a passenger side door, and a rear slide door of a passenger car. In FIG. 1, a back door 1 is pivotally secured on a rear end portion of a vehicle 12 via a door hinge 1a. The back door 1 is supported by an air damper 30. In addition, a driving motor M, a deceleration mechanism R for decelerating a rotation speed of the driving motor M, an arm member 3b and a rod 4 for connecting the deceleration mechanism R with the back door 1 are provided at the rear end portion of the vehicle 12. When the driving motor M is rotated, the arm member 3b and the rod 4 are driven whereby the back door 1 is driven in an opening or closing direction. The driving motor M is driven by a signal sent from a controller 5.

When an object or a human body exists behind the vehicle while the back door 1 is driven in the opening direction, or when an object or a human body exists between the back door 1 and the rear portion of the vehicle 12 while the back door 1 is driven in the closing direction, a pinching is determined. Then, the back door 1 is stopped to operate by stopping the driving motor M or reversed by reversing the driving motor M.

The controller 5 is a control unit (not shown in detail) wherein a microprocessor is mounted. The controller 5 is constituted to perform a feedback control of an output to the driving motor M so that the back door 1 can be maintained at a given speed.

Figure 2:
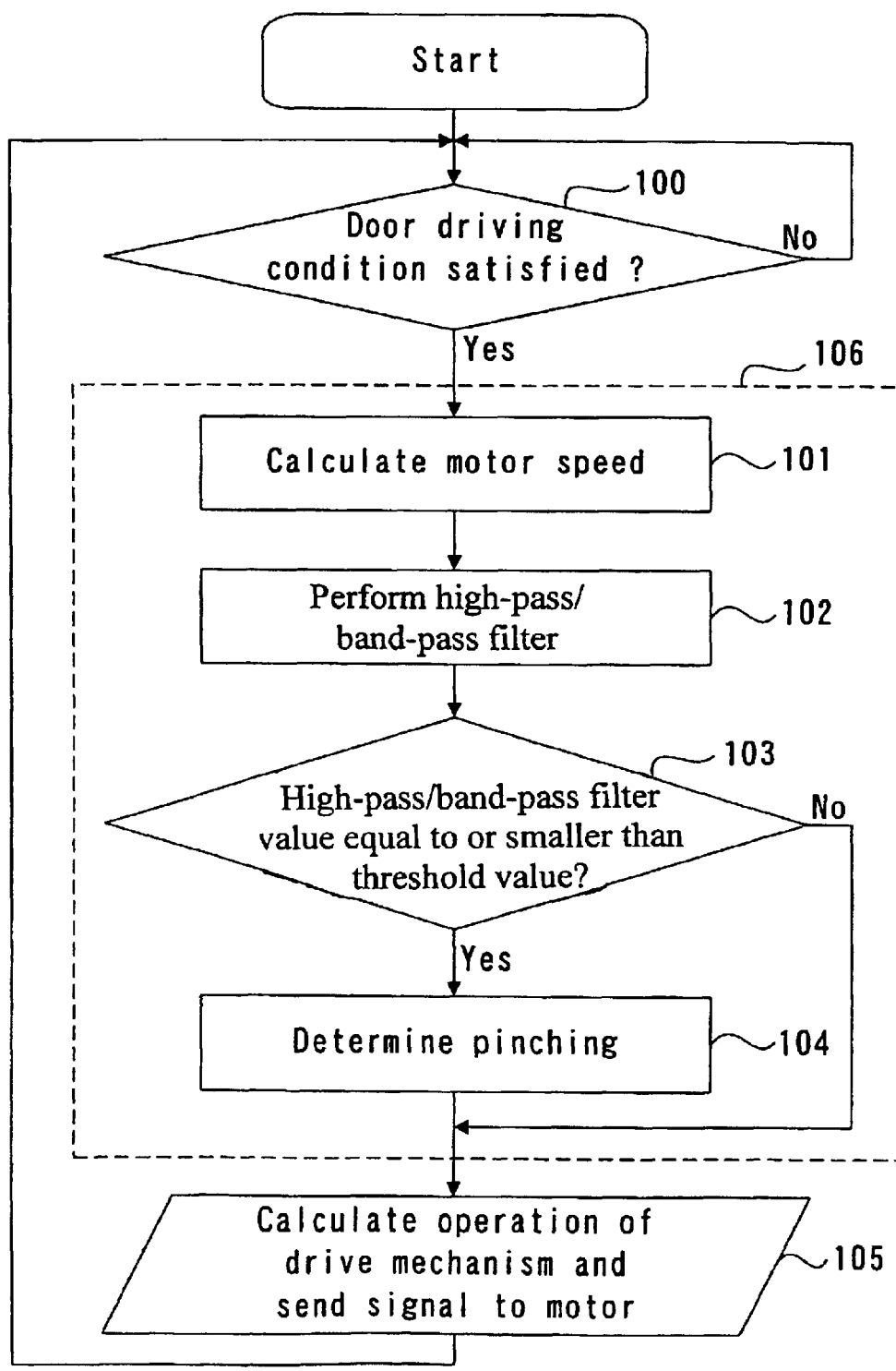
FIG. 2 is a flowchart showing a control method of the opening and closing member of the vehicle by the opening and closing control device according to the embodiment of the present invention.

The controller 5 is operated in accordance with a flow-chart of FIG. 2. First, the controller 5 determines whether a door driving condition is satisfied or not at step 100. For example, the back door 1 is started to open or close when a person touches a doorknob of the back door 1 based on the determination at step 100. When the door driving condition is not satisfied, the controller 5 executes no operations. When the door driving condition is satisfied, pinching determination logic is performed at step 106. Then, an operation of a drive mechanism is calculated and a signal is sent to the driving motor M. The above-mentioned steps are repeated while the door driving condition is satisfied. In addition, the above-mentioned steps include a detection means (not shown) to detect a fully open or fully closed state of the back door 1. When the back door 1 is in the fully open or fully closed state, the back door 1 is stopped to operate.

In the pinching determination logic at step 106, an actual motor speed of the driving motor M is first calculated at step 101. In this case, the actual motor speed may be calculated from the frequency of ripple after measuring the ripple of the voltage or current applied to the driving motor M.

At stop 102, a high-pass filter is applied to the actual motor speed calculated at step 101 for eliminating a low frequency range of the actual motor speed.

Next at step 103, it is determined whether the actual motor speed after passing through the high-pass filter is lower than a predetermined threshold value or not. When the actual motor speed is lower than the predetermined threshold value, existence of the pinching is determined and the pinching determination process is performed at step 104. When the actual motor speed after passing through the high-pass filter is greater than the predetermined threshold value, the existence of the pinching is not determined and step 104 is skipped.

When the existence of the pinching is determined at step 104, the driving motor M is stopped or revered according to the operation calculation of the drive mechanism at step 105. Instead of stopping or reversing the driving motor M, the target speed of the driving motor may be lowered or the feedback control may be stopped.

According to the aforementioned structure, the target speed of the driving motor M is substantially equal to the actual speed of the driving motor M when no pinching occurs. When the target speed is constant, a high frequency component of the actual speed is not produced. Thus, a high-pass filter value (HPF value) is constant. When the pinching occurs at this point, the actual speed is drastically decreased. The high-pass filter value is then decreased so that the actual speed being drastically decreased can pass through the high-pass filter. Therefore, when the actual motor speed after passing through the high-pass filter is lower than the predetermined threshold value, the existence of the pinching can be determined. Even if an offset exists in a measuring value of the actual speed of the driving motor M, the offset is a low frequency component and thus eliminated by the high-pass filter. The pinching can be correctly determined accordingly.

When the high-frequency noise further affects the detection result of the actual speed of the driving motor M due to a rotation of the driving motor M, the electromagnetic wave generated by the controller 5, and the electromagnetic noise from outside of the vehicle, a band-pass filter can be used instead of the high-pass filter. The band-pass filter allows only upper and lower frequency ranges with respect to the measuring value or a theoretical value to pass through. The other ranges, i.e. high frequency range and the low frequency range, can be eliminated or the gain thereof can be reduced.

Figure 3:
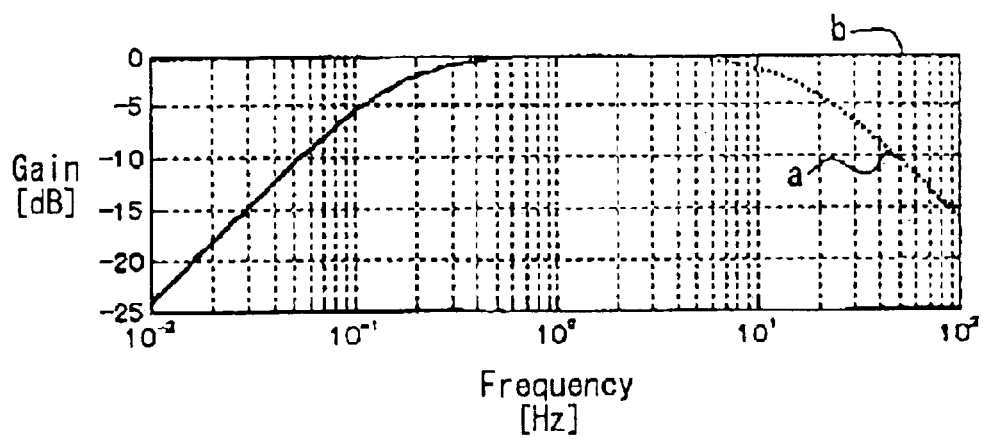
FIG. 3 is a characteristics view of a filter according to the embodiment of the present invention.
Figure 4:
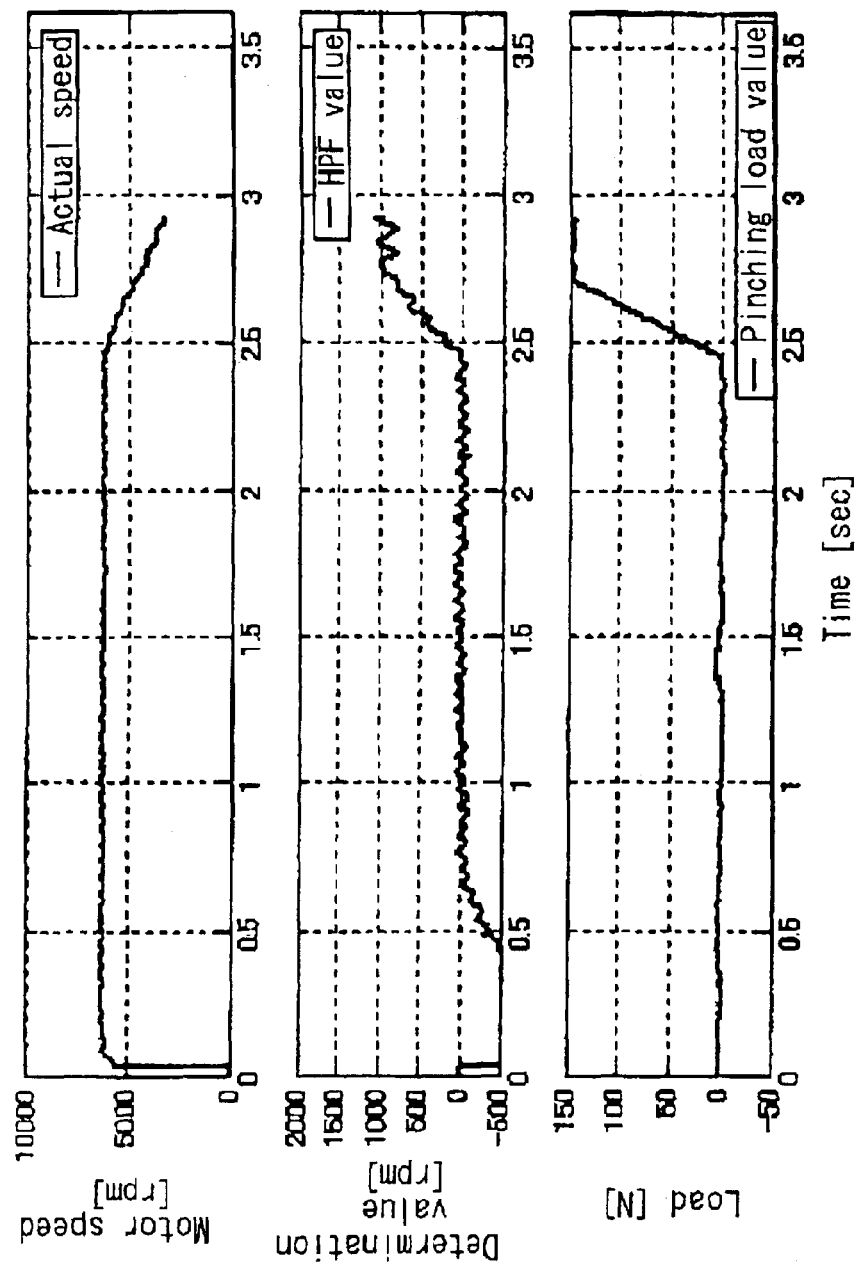
FIG. 4 is a time chart of the filter according to the embodiment of the present invention.
Figure 5:
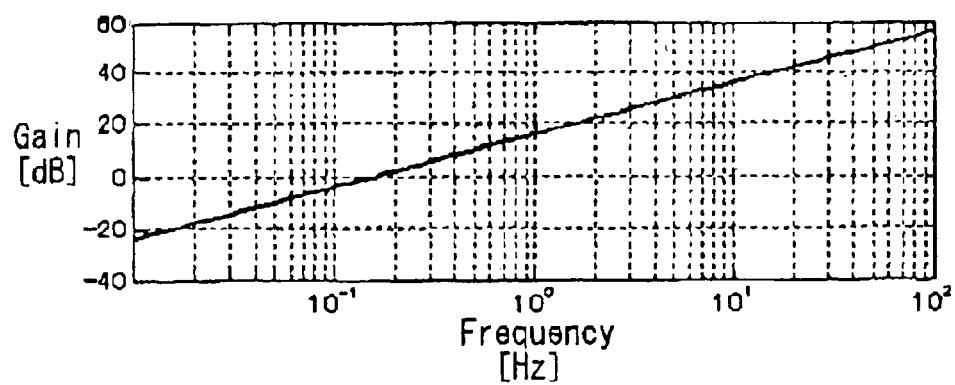
FIG. 5 is a characteristics view of a filter according to a conventional opening and closing device for an opening and closing member of a vehicle.
Figure 6:
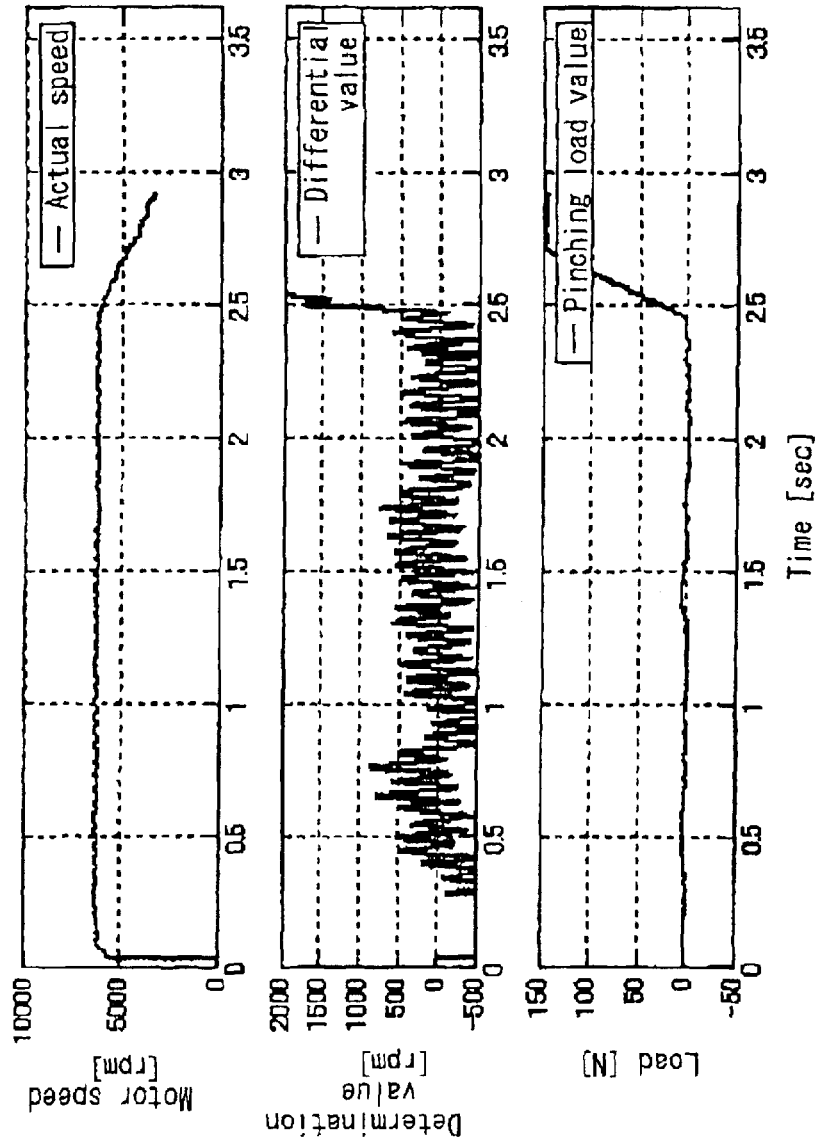
FIG. 6 is a time chart of the filter according to the conventional opening and closing device for the opening and closing member of the vehicle.

FIGS. 3 and 4 are characteristics diagrams according to the present embodiment while FIGS. 5 and 6 are characteristics diagrams according the known invention, which uses the differential for the determination of the pinching. "a" and "b" in FIG. 3 are examples of the band-pass filter and the high-pass filter respectively. As shown in FIG. 3, each gain of the high-pass filter and the band-pass filter is decreased in the low frequency range less than or equal to 0.6 Hz. Further, the gain of the band-pass filter is decreased in the high frequency range greater than or equal to 6 Hz. In FIG. 5, in which the differential is used, the gain increases as the frequency increases. The change amount of the speed can be extracted due to the differential being used. However, an amplitude of the high-frequency based on the noise is larger and thus a peak value of the high-frequency exceeds a predetermined value whereby the wrong determination that the pinching has occurred may be caused as shown in FIG. 6.

The high-pass filter and the band-pass filter in FIG. 3 show the same characteristics as FIG. 5 until a halfway portion of the frequency. In a portion to the right of a cutoff frequency, i.e. in the high-frequency range, the gain shows flat characteristics whereby the influence caused by the sensor noise is not likely to occur. The wrong determination can be drastically reduced and thus the determination value can be stable as shown in FIG. 4.

Further, if unnecessary high-frequency produced at the pinching can be eliminated by a band-pass filter as shown in FIG. 3 "a" by specifying the frequency based on an experiment and the like, only the frequency produced at the pinching can be extracted and thus robustness against the sensor noise can be increased.

According to the above-mentioned embodiment, the gain can be drastically decreased in the low-frequency range, i.e. the offset (direct current) component can be eliminated. Even if the offset exists at a relationship between the voltage and the motor speed relative to a nominal state due to the voltage and a sliding resistance of each mechanical system, only the fluctuation amount of the motor speed can be extracted and thus accurate pinching determination can be achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. An opening and closing device for an opening and closing member of a vehicle comprising:
    a driving motor for driving the opening and closing member;
    a feedback control means for controlling an output duty to the driving motor so that a preset target speed of the driving motor can be achieved;
    a high-pass filter for filtering a frequency of an actual speed of the driving motor; and
    a pinching determination means for determining a pinching of an object based on a comparison of the frequency of the actual speed of the driving motor after passing through the high-pass filter and a predetermined threshold value.

2. An opening and closing device according to claim 1, wherein;
    when the frequency of the actual speed after passing through the high-pass filter is lower than the predetermined value, an existence of the pinching of the object is determined.

3. An opening and closing device for an opening and closing member of a vehicle comprising:
    a driving motor for driving the opening and closing member;
    a feedback control means for controlling an output duty to the driving motor so that a preset target speed of the driving motor can be achieved;
    a band-pass filter for filtering a frequency of an actual speed of the driving motor; and
    a pinching determination means for determining a pinching of an object based on a comparison of the frequency of the actual speed of the driving motor after passing through the band-pass filter and a predetermined threshold value.

4. An opening and closing device according to claim 3, wherein;
    gains in a low-frequency range and a high-frequency range respectively are decreased as a frequency is decreased in the low-frequency range and increased in the high-frequency range respectively.

5. An opening and closing device according to claim 4, wherein;
    when the frequency of the actual speed after passing through the band-pass filter is lower than the predetermined value, an existence of the pinching of the object is determined.

* * * * *